United States Patent [19]

Damman et al.

[11] Patent Number: 5,681,050
[45] Date of Patent: Oct. 28, 1997

[54] AIR BAG RETAINER

[75] Inventors: Alex Scott Damman, Clayton; John Clifford Hattery, Jr., Dublin, both of Ohio

[73] Assignee: General Motors Corporation, Detroit, Mich.

[21] Appl. No.: 667,120

[22] Filed: Jun. 20, 1996

[51] Int. Cl.⁶ .................................................. B60R 21/16
[52] U.S. Cl. ........................ 280/728.2; 280/732
[58] Field of Search ........................ 280/728.1, 728.2, 280/732, 743.1

[56] References Cited

U.S. PATENT DOCUMENTS

| | | | |
|---|---|---|---|
| 5,263,739 | 11/1993 | Webber et al. | 280/728.2 |
| 5,308,110 | 5/1994 | Kokeguchi | 280/732 |
| 5,344,182 | 9/1994 | Lauritzen et al. | 280/728.2 |
| 5,413,375 | 5/1995 | Daines et al. | 280/728.2 |
| 5,454,586 | 10/1995 | Rogerson | 280/728.2 |

FOREIGN PATENT DOCUMENTS 6-115403  4/1994  Japan ................................ 280/728.2

*Primary Examiner*—Paul N. Dickson
*Attorney, Agent, or Firm*—Kathryn A. Marra

[57] ABSTRACT

An air bag module in a vehicle includes a housing and an inflatable air bag having a mouth portion defining an air bag opening, the mouth portion including opposing axially extending side edges. The module further includes an air bag retainer for securing the air bag to the housing. The retainer includes a pair of axially elongated retainer bars each including an axially elongated main body portion and an axially elongated thin tail portion extending radially outward from the main body portion. The side edges of the air bag are each secured to a respective thin tail portion of the retainer bars such that movement of the air bag relative the retainer bars is prevented during assembly and during air bag inflation.

20 Claims, 1 Drawing Sheet

AIR BAG RETAINER

This invention relates to a vehicle air bag module, and more particularly to an air bag retainer for mounting an air bag to the module.

BACKGROUND OF THE INVENTION

It is well known in motor vehicles to provide an air bag module mounted beneath an opening in the instrument panel. The module typically includes a metal housing having opposing side walls and end walls defining an air bag deployment opening. The module also typically includes an air bag having a mouth portion mounted to the housing by an air bag retainer. The air bag retainer typically has retainer apertures which must be aligned with corresponding air bag apertures on the mouth portion of the air bag. Since the air bag is a flexible material, the air bag retainer is needed to provide support to the mouth portion of the air bag and to stiffen the mouth portion of the air bag for easier attachment of the air bag to the housing. The housing has housing apertures which must be aligned with the retainer apertures and air bag apertures so that fasteners can be inserted through all three sets of aligned apertures to attach the air bag and retainer to the housing. It is often difficult during assembly to align the air bag apertures of the flexible mouth portion of the air bag with the housing apertures and the retainer apertures. An inflator is mounted beneath the air bag in the housing and discharges inflator gas to inflate the air bag when sensing predetermined vehicle conditions. The opening in the instrument panel is typically covered by a hinged cover door which is forced open by the deploying air bag.

It is also known in the prior art to provide an extruded housing which includes channels which are formed in the housing. It is also known to provide a rod-shaped retainer for connecting the mouth portion of the air bag to the housing. In the prior art, it is known to provide a hem loop in the mouth portion and then to slide the retainer into the hem loop of the air bag. However, sliding the retainer into the hem loop can be difficult during assembly. It is also known to wrap the air bag material around the retainer and then to sew the air bag material on itself to hold the retainer in the air bag. However, in both instances, the air bag material can slide relative the retainer. This makes it difficult during assembly to keep the air bag material from bunching up on the retainer when the retainer and surrounding air bag material are slid into the channel in the housing.

SUMMARY OF THE INVENTION

The present invention solves the shortcomings of the prior art by providing an air bag retainer which is lightweight, which is easy to manufacture and which is easy to assemble to the housing. Advantageously, an air bag retainer is connected directly to the air bag such that the air bag and retainer are easily connected to the housing without the retainer moving or bunching up relative the air bag during assembly.

These advantages are accomplished in the present invention by providing an air bag module in a vehicle including a housing and an inflatable air bag having a mouth portion defining an air bag opening, the mouth portion including opposing axially extending side edges. The module further includes an air bag retainer for securing the air bag to the housing. The retainer includes a pair of axially elongated retainer bars each including an axially elongated main body portion and an axially elongated thin tail portion extending radially outward from the main body portion. The side edges of the air bag are each secured to a respective thin tail portion of the retainer bars such that movement of the side edges of the air bag relative the retainer bars is prevented during assembly and during air bag inflation.

In a preferred form, the housing includes opposing side portions each having a channel thereon. Each of the channels has a slit therein and the main body portions are trapped within the respective channels. Also, the tail portions extend out through the slits of the channels when the retainer bars are trapped within the channels. Preferably, the side edges of the mouth portion are sewn to the tail portions. Also preferably, each of the retainer bars including the main body portion and tail portion is a single integral extrusion having a continuous cross-sectional shape.

The tail portions preferably have opposing inboard and outboard tail surfaces and the side edges of the mouth portion extend around the main body portions and are secured to the inboard and outboard tail surfaces of the tail portions. Alternately, the side edges of the mouth portion abut only one of the surfaces when secured to the tail portions such that the side edges of the air bag are spaced above the channels when the retainer bars are secured within the channels. Since the side edges of the air bag are secured to the tail portions, the side edges of the air bag do not move relative to the retainer during assembly and does not bunch up on the retainer bars making assembly easier.

Preferably, the retainer bars, including the main body portion and the tail portions, extend along substantially the entire axial length of the housing and each of the side edges of the air bag are secured to substantially the entire axial length of the respective tail portions. Thus, the side edges advantageously do not move or bunch up on the retainer bars during assembly.

In accordance with another preferred aspect of the invention, an axially extending insert is included in the main body portions of the retainer bars for strengthening the main body portions. The insert may be a metal wire or rod.

BRIEF DESCRIPTION OF THE DRAWINGS

An embodiment of the present invention is described, by way of example only, with reference to the accompanying drawings in which.

DESCRIPTION OF THE PREFERRED EMBODIMENT

Figure 1:
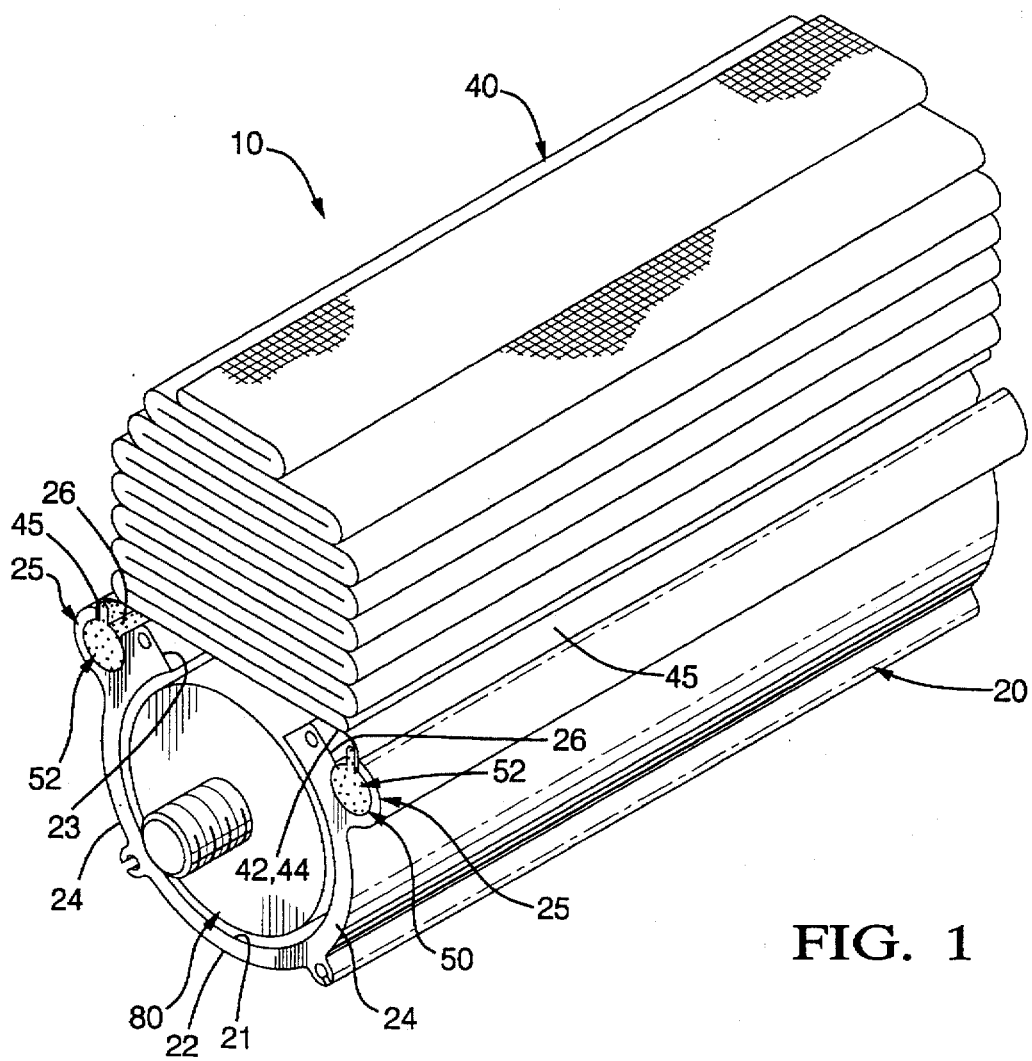
FIG. 1 is an air bag module with an air bag assembled to an air bag retainer and the retainer and air bag assembled to the housing.

Referring to FIG. 1, an air bag module 10 includes the component parts of a housing 20, an inflator 80 mounted in the housing 20, an air bag retainer 50, and an air bag 40 secured to the air bag retainer 50. The air bag 40 is secured to the housing 20 via the retainer 50, as described below.

The housing 20 is preferably an axially elongated, generally circular extrusion having an internal surface 21 and an external surface 22. The housing 20 is sized and shaped for closely receiving the inflator 80 therein. The housing 20 has an upper housing opening 23 preferably extending entirely across the axial length of the housing 20 for permitting inflator gas to discharge into the air bag 40, as described further hereinafter. The housing 20 has opposing side portions 24 located on opposing sides of the housing opening 23. Each of the side portions 24 of the housing 20 includes an integrally formed channel 25 thereon sized for closely receiving the retainer 50 therein. The channels 25 each preferably extend along the entire axial length of the housing 20. The channels 25 each have open ends for slidably receiving the retainer 50 therein. The channels 25 also each include an upwardly opening slit 26 which preferably extends along the entire axial length of the channels 25.

An inflator 80 is mounted in the housing 20 for discharging inflator gas upon sensing predetermined vehicle conditions to inflate the air bag 40. The inflator 80 is preferably mounted on the internal surface 21 of the housing 20 and has ports (not shown) for discharging inflator gas out through the housing opening 23 and into the air bag 40 for deployment. The entire module 10 is typically mounted beneath the instrument panel (not shown) of a vehicle and covered by a hinged cover door (not shown) prior to deployment.

Figures 2, 3, 4:
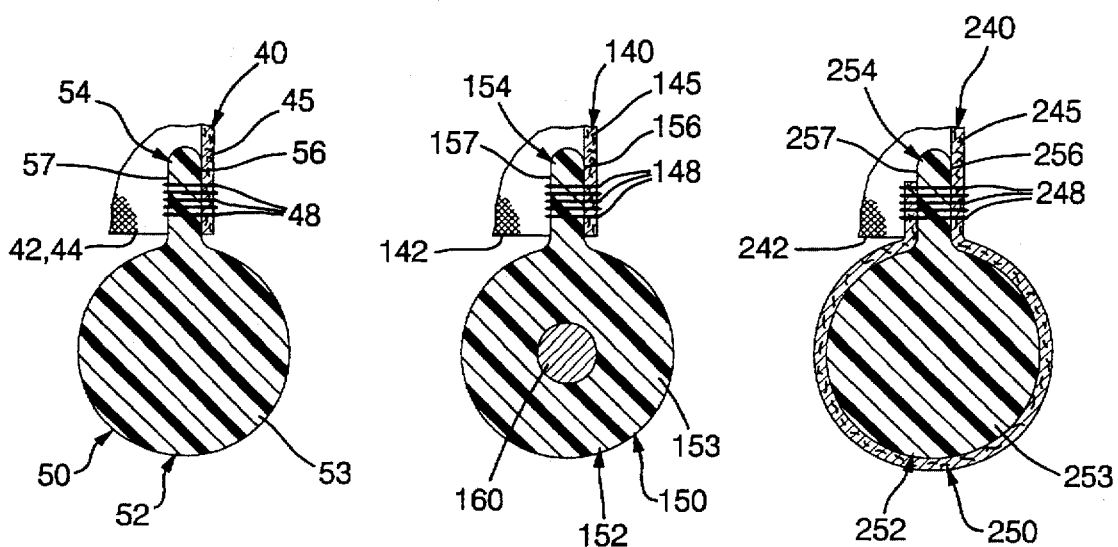
FIG. 2 is cross-sectional view of the air bag retainer with the air bag assembled thereto and with the air bag partially broken away.
FIG. 3 is a cross-sectional view similar to FIG. 2, but showing an alternate embodiment of the invention.
FIG. 4 is a cross-sectional view similar to FIG. 2, but showing another alternate embodiment of the invention.

Referring to FIGS. 1 and 2, the air bag 40 is made of a conventional fabric material and is normally stored in a folded condition atop the inflator 80 and preferably atop the housing opening 23. The air bag 40 includes a mouth portion 42 forming an air bag opening 44 for receiving inflator gas therethrough. The mouth portion 42 includes axially extending, opposing side edges 45 located on opposing sides of the air bag opening 44. In the preferred embodiment, the side edges 45 of the mouth portion 42 are each shown as a single layer of air bag material. However, it will be appreciated that the side edges 45 could be folded over onto themselves to provide multiple layers of air bag material at the side edges 45 for greater strength at the mouth portion 42, if needed.

The air bag retainer 50 comprises a pair of axially elongated retainer bars 52 each being a one-piece continuous extrusion, preferably formed of a plastic material. Each of retainer bars 52 has a continuous cross-section including an axially elongated main body portion 53 and an axially elongated thin tail portion 54 extending radially outward from the main body portion 53. The main body portions 53 are sized and shaped for closely mating with the channels 25 of the housing 20. The main body portions 53 preferably are shown as generally circular for matching the generally circular shape of the channels 25 on the housing 20. However, it will be appreciated that any mating geometrical shapes of the main body portions 53 of the retainer bars 52 and the channels 25 of the housing 20 may be possible, such as rectangular, oval or others.

Referring to FIGS. 1 and 2, the tail portions 54 are each preferably integrally formed with the main body portions 53 of the retainer bars 52. The tail portions 54 are substantially thinner than the main body portions 53 of the retainer bars 52. The tail portions 54 each have a generally planar outboard tail surface 56 and an opposite inboard tail surface 57. The tail portions 54 are preferably thinned such that the side edges 45 of the air bag 40 can easily be sewn to the tail portions 54, as will now be described.

The air bag 40 is assembled to the retainer 50 as follows. One of the side edges 45 of the mouth portion 42 of the air bag 40 is abutted against and secured to the outboard tail surface 56 of one of the tail portions 54 of the retainer bars 52 of the retainer 50, preferably by sewing using thread 48. Then the other of the side edges 45 of the mouth portion 42 of the air bag 40 is secured to the outboard tail surface 56 of the other tail portions 54 of the retainer bars 52 of the retainer 50, also preferably by sewing. Preferably, the side edges 45 of the mouth portion 42 are sewn to the outboard tail surfaces 56 of the tail portions 54 substantially along the entire axial lengths of the tail portions 54. Advantageously, the air bag 40 is secured directly to the retainer 50, preferably by sewing and without the use of traditional fasteners. Also advantageously, the air bag 40 is secured directly to the retainer 50 such that the side edges 45 of the air bag 40 are fixed and cannot move or slide relative to the retainer 50 during assembly to the housing 20, as will now be described.

The retainer bars 52 of the retainer 50 are each coaxially aligned with the channels 25 on the housing 20. More specifically, the tail portions 54 are aligned with and extend out through the slits 26 in the channels 25 and the main body portions 53 are coaxially aligned with the channels 25. Next, the retainer bars 52, with the air bag 40 attached to the tail portions 54, are axially slid into the channels 25. It will be appreciated that the air bag 40 does not bunch up relative to the retainer bars 52 of the retainer 50 during assembly to the housing 20 since the tail portions 54 extend out through the slits 26 beyond the channels 25 and also since the side edges 45 are sewn directly to the tail portions 54 preferably along the entire axial length of the tail portions 54. During assembly of the retainer bars 52 to the channels 25 of the housing 20, the main body portions 53 are trapped in the channels 25 and the tail portions 54 extend out through the slits 26 in the channels 25, such that the side edges 45 of the air bag 40 are spaced above the channels 25 and do not interfere with assembly of the retainer bars 52 within the channels 25 of the housing 20.

The air bag 40 may be folded either before or after assembly of the retainer 50 to the housing 20 since the retainer bars 52 are easily accessible for sliding into the channels 25 of the housing 20 when the air bag 40 is in the folded condition.

After the air bag 40 is assembled to the retainer bars 52 forming the retainer 50 and after the retainer 50 is assembled to the housing 20, the remainder of the air bag module 10 is assembled as follows. The inflator 80 is axially inserted into the housing 20 such that it partially rests on the internal surface 21 of the housing 20. A pair of end plates (not shown) may be attached to opposing ends of the housing 20 to axially trap the inflator 80 and the retainer bars 52 of the retainer 50 within the housing 20. One of the end plates is preferably attached to the housing 20 prior to attachment of the retainer 50 and air bag 40 and the other of the end plates is preferably attached to the housing 20 prior to or with the inflator 80. For example, the end plate may be integrally attached to the inflator 80. It will further be appreciated that the air bag 40 may be maintained in the folded condition by covering the folded air bag 40 with a soft covering, such as TYVEK paper, which is attached to the external surface 22 of the side portions 24 of the housing 20, such as by tape.

Upon the sensing of predetermined vehicle conditions, the inflator 80 generates inflator gas and discharges the inflator gas which is directed out through the housing opening 23 and into the air bag opening 44 such that the air bag 40 is inflated. The air bag 40 remains anchored to the housing 20 during deployment by the trapping of the main body portions 53 of the retainer bars 52 of the retainer 50 within the channels 25 of the housing 20 and also by the side edges 45 of the air bag 40 being secured to the tail portions 54 of the retainer bars 52.

It will be understood that a person skilled in the art may make modifications to the preferred embodiment shown herein within the scope and intent of the claims. Although the preferred embodiment shows the side edges 45 of the air bag 40 preferably being secured to the tail portions 54 by sewing, it will be appreciated that other attachment methods such as gluing, bonding, or fastening by fasteners may also be used. Although the preferred embodiment shows the side edges 45 of the air bag 40 being secured to the outboard tail surfaces 56 of the tail portions 54, it will be appreciated that the side edges 45 could alternately be secured to the inboard tail surfaces 57 of the tail portions 54 or could be secured to both the inboard and outboard tail surfaces 56, 57 of the tail portions 54 as described below in the alternate embodiment shown in FIG. 4.

FIG. 3 shows an alternate embodiment of the air bag module having a retainer 150. The retainer 150 includes a pair of axially elongated retainer bars 152 each having a continuously extruded main body portion 153 and a thin tail portion 154 extending radially outward from the main body portion 153, preferably integrally formed of a plastic material. The thin tail portions 154 each have a generally planar outboard tail surface 156 and an opposite inboard tail surface 157. An air bag 140 has a mouth portion 142 including opposing side edges 145 which abut and are secured to outboard tail surfaces 156 of the tail portions 154 of the retainer bars 152, such as by sewing using thread 148. The main body portions 153 of the retainer bars 152 preferably each include an axially extending insert 160, such as a metal wire or rod, integrally extruded with the main body portions 153 for providing additional strength to the retainer bars 152 of the retainer 150.

FIG. 4 shows another alternate embodiment having a retainer 250 similar to that shown in FIGS. 1 and 2, and including a pair of axially elongated retainer bars 252 each having a continuously extruded main body portion 253 and a thin tail portion 254 extending radially outward from the main body portion 253. The retainer bars 252 are each preferably integrally formed of a plastic material. The thin tail portions 254 each include an outboard tail surface 256 and an inboard tail surface 257. An air bag 240 has a mouth portion 242 including opposing side edges 245 which are secured to the tail portions 254 of the retainer bars 252, such as by sewing using thread 248. However, the side edges 245 of the air bag 240 each preferably extend around and substantially surround the main body portions 253 and the tail portions 254 of the retainer bars 252 such that each of the side edges 245 is secured to both the outboard and inboard tail surfaces 256, 257 of the respective tail portions 254. It will be appreciated that side edges 245 are not slidable relative to the retainer bars 252 since the side edges 245 are advantageously secured directly to the radially extending thin tail portions 254, and are not simply sewn back onto themselves.

It will be appreciated that the main body portions 253 as shown in the embodiment in FIG. 4, may alternately include an axially extending insert, such as a metal wire or rod, (not shown) integrally extruded with the main body portion 253, similar to the insert 160 shown in FIG. 3, for providing additional strength to the retainer bars 252 of the retainer 250.

While the present invention has been described as carried out in a specific embodiment thereof, it is not intended to be limited thereby but is intended to cover the invention broadly within the scope and spirit of the claims.

What is claimed is:

1. An air bag module in a vehicle comprising:
   a housing;
   an inflatable air bag having a mouth portion defining an air bag opening, the mouth portion including opposing axially extending side edges; and
   a retainer for securing the air bag to the housing, the retainer including a pair of axially elongated retainer bars each including an axially elongated main body portion and an axially elongated thin tail portion extending radially outward from the main body portion, the side edges of the air bag each being attached directly to the respective thin tail portions of the retainer bars substantially along the entire axial length of the tail portions.

2. The air bag module of claim 1 wherein the housing includes opposing side portions each having a channel thereon, each of the channels having a slit therein and wherein the main body portions are secured and trapped within the respective channels and wherein the tail portions extend out through the slits of the channels when the retainer bars are secured within the channels.

3. The air bag module of claim 2 wherein the tail portions have opposing inboard and outboard tail surfaces and wherein the side edges of the mouth portion are secured directly to one of the surfaces when secured to the tail portions and wherein the side edges of the air bag are located substantially outside the channels when the retainer bars are secured within the channels.

4. The air bag module of claim 1 wherein the side edges of the mouth portion are sewn directly to the tail portions.

5. The air bag module of claim 1 wherein the tail portions have opposing inboard and outboard tail surfaces and wherein the side edges of the mouth portion extend around the main body portions and abut and are secured to both the inboard and outboard tail surfaces of the tail portions substantially along the entire axial lengths of the tail portions.

6. The air bag module of claim 1 wherein the tail portions have opposing inboard and outboard tail surfaces and wherein the side edges of the mouth portion are attached directly to both of the surfaces when secured to the tail portions.

7. The air bag module of claim 12 wherein the retainer bar is integrally molded of a plastic material.

8. The air bag module of claim 1 wherein the main body portions and tail portions of the retainer bars are integrally molded of a plastic material and wherein the main body portions include an axially extending insert therein for strengthening the retainer bars.

9. An air bag module in a vehicle comprising:
   a housing;
   an inflatable air bag having a mouth portion defining an air bag opening, the mouth portion including opposing axially extending side edges; and
   a retainer for securing the air bag to the housing, the retainer including a pair of axially elongated retainer bars each including an axially elongated main body portion and an axially elongated thin tail portion extending radially outward from the main body portion, the side edges of the air bag each being secured to the respective thin tail portions of the retainer bars and the retainer bars including the main body portions and the tail portions extending along substantially the entire axial length of the housing.

10. The air bag module of claim 9 wherein each of the side edges of the air bag is secured to substantially the entire axial length of the respective tail portions.

11. An air bag module in a vehicle comprising:
   a housing;

an inflatable air bag having a mouth portion defining an air bag opening, the mouth portion including opposing axially extending side edges; and a retainer for securing the air bag to the housing, the retainer including a pair of axially elongated retainer bars each including an axially elongated main body portion and an axially elongated thin tail portion extending radially outward from the main body portion, the side edges of the air bag each being secured to the respective thin tail portions of the retainer bars and each of the retainer bars including the main body portion and the tail portion being a single integral extrusion having a continuous cross-sectional shape.

12. An air bag module in a vehicle comprising:

a housing;

an inflatable air bag having a mouth portion defining an air bag opening, the mouth portion including opposing axially extending side edges; and a retainer for securing the air bag to the housing, the retainer including a pair of axially elongated retainer bars each including an axially elongated main body portion and an axially elongated thin tail portion extending radially outward from the main body portion, the side edges of the air bag each being secured to the respective thin tail portions of the retainer bars and wherein an axially extending insert is included in the main body portions of the retainer bars for strengthening the main body portions.

13. The air bag module of claim 12 wherein the axially extending insert is a metal rod.

14. An air bag module in a vehicle comprising:

a housing having opposing side portions each including an axially elongated channel, each of the channels having a slit therein;

an inflatable air bag having a mouth portion defining an air bag opening, the mouth portion including opposing axially extending side edges; and an air bag retainer including a pair of axially elongated retainer bars for insertion within the respective channels of the housing, each of the retainer bars including a main body portion secured and trapped within the channels and a thin tail portion extending radially outward from the main body portion and out through the slits in the channels, each of the side edges of the air bag being attached directly to the tail portions of the retainer bars whereby movement of the side edges of the air bag relative to the retainer bars is prevented during assembly and air bag inflation.

15. The air bag module of claim 14 wherein the side edges of the mouth portion are sewn directly to the tail portions.

16. The air bag module of claim 14 wherein the tail portions have opposing inboard and outboard tail surfaces and wherein the side edges of the mouth portion extend around the main body portions and are directly attached to the inboard and outboard tail surfaces of the tail portions.

17. The air bag module of claim 14 wherein the tail portions have opposing inboard and outboard tail surfaces and wherein the side edges of the mouth portion abut one of the surfaces when attached directly to the tail portions and wherein the side edges of the air bag are located substantially outside of the channels when the retainer bars are secured within the channels.

18. The air bag module of claim 14 wherein the retainer bars including the main body portions and the tail portions extend along substantially the entire axial length of the housing and wherein each of the side edges of the air bag is secured to substantially the entire axial length of the respective tail portions.

19. The air bag module of claim 14 wherein each of the retainer bars including the main body portion and tail portion is a single integral extrusion having a continuous cross-sectional shape.

20. An air bag module in a vehicle comprising:

a housing including opposing side portions each having a channel thereon, each of the channels having a slit therein;

an inflatable air bag having a mouth portion defining an air bag opening, the mouth portion including opposing axially extending side edges; and a retainer for securing the air bag to the housing, the retainer including a pair of axially elongated retainer bars each including an axially elongated main body portion and an axially elongated thin tail portion extending radially outward from the main body portion, the main body portions being secured and trapped within the respective channels of the housing and the tail portions extending out through the slits of the channels and the side edges of the air bag being directly attached to the tail portions and the side edges of the air bag being located substantially outside of the channels when the retainer bars are secured within the channels.

* * * * *